Dec. 2, 1969  J. J. BARGER ET AL  3,482,076
APPARATUS FOR WELDING IN A NARROW, GENERALLY
VERTICAL, STRAIGHT-WALLED GROOVE
Filed Oct. 10, 1968  5 Sheets-Sheet 1

INVENTORS
JOHN J. BARGER
GEORGE R. MADEWELL
BY Lawrence P. Kessler
ATTORNEY

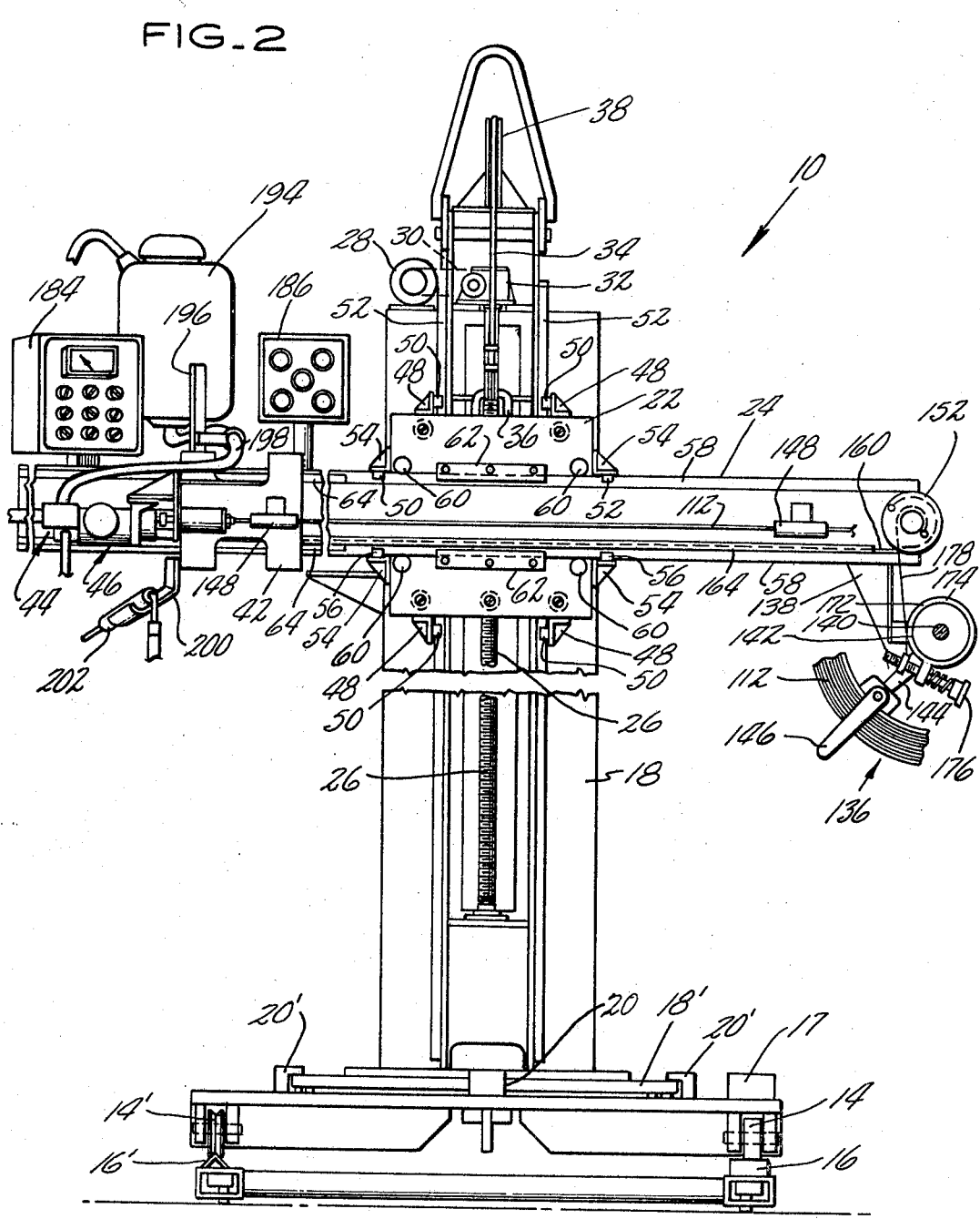

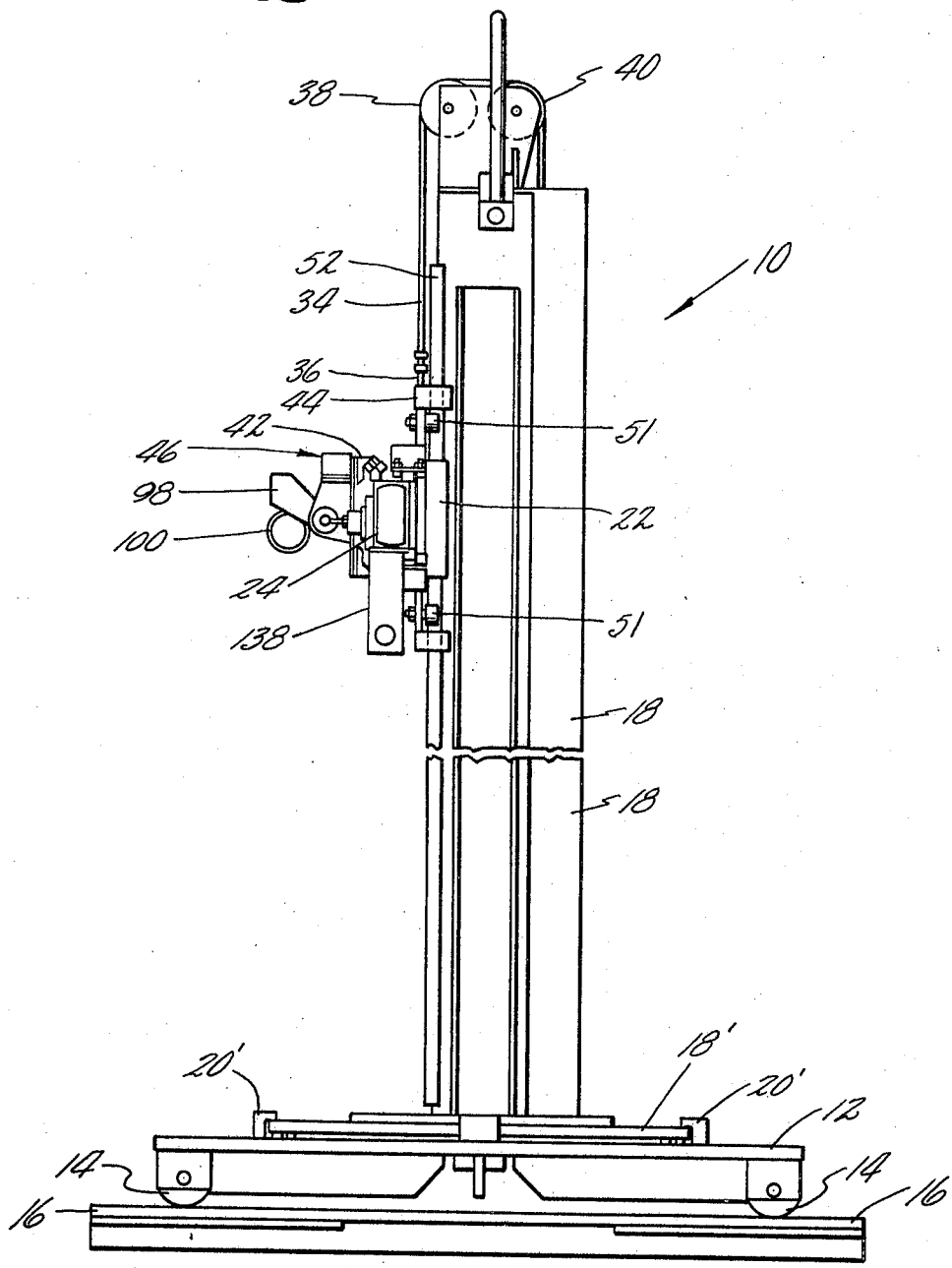

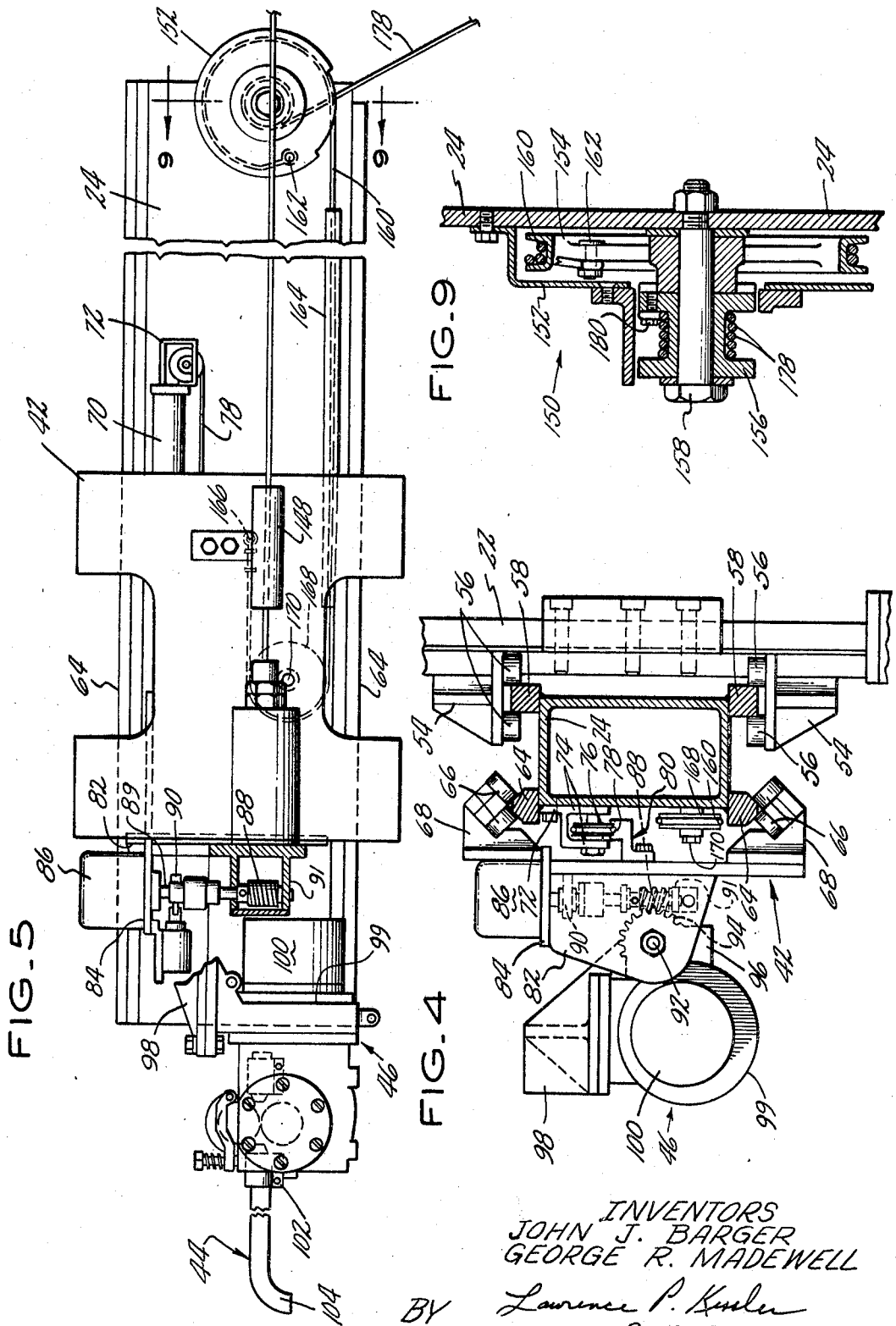

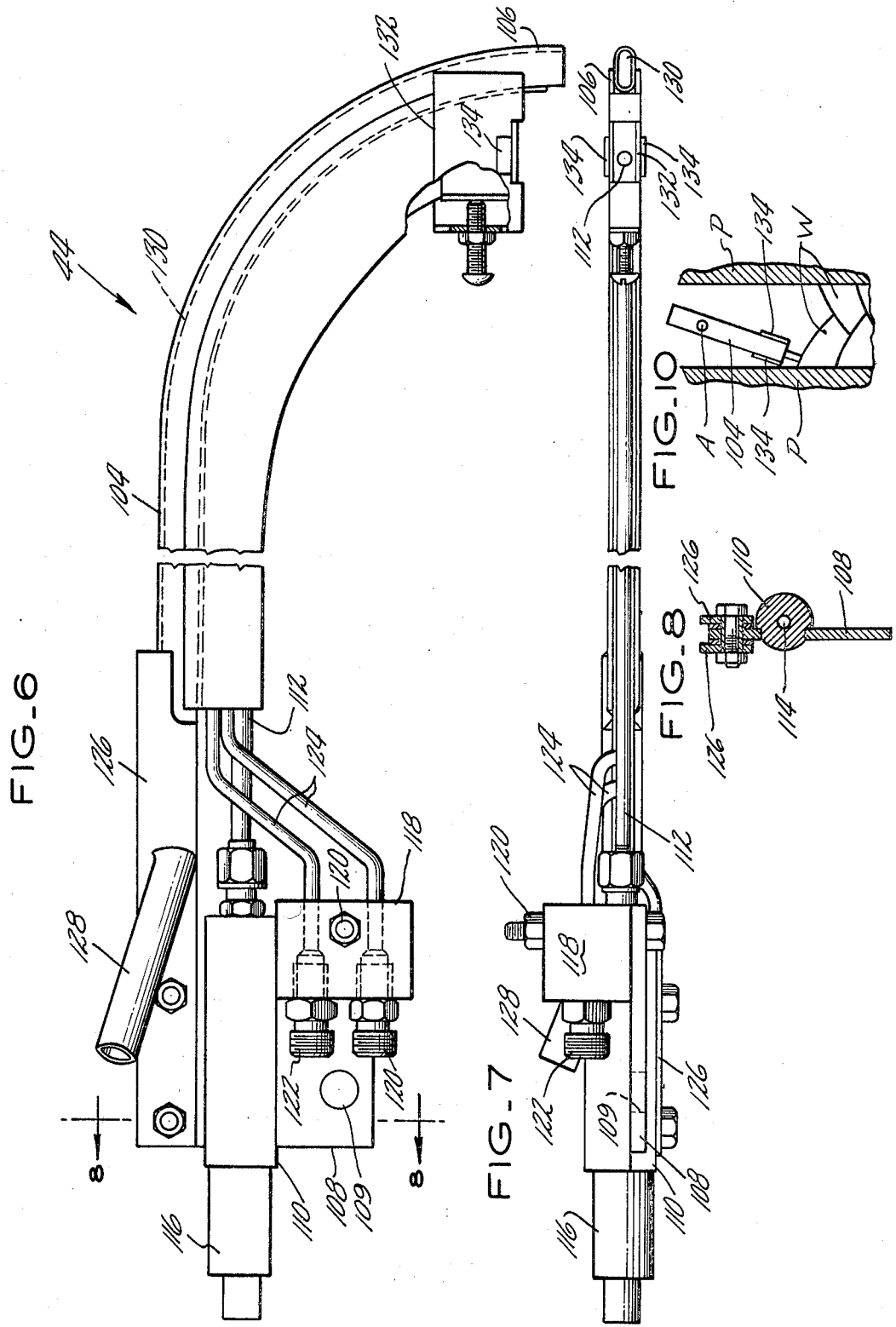

United States Patent Office 3,482,076
Patented Dec. 2, 1969

3,482,076
APPARATUS FOR WELDING IN A NARROW, GENERALLY VERTICAL, STRAIGHT-WALLED GROOVE
John J. Barger, Ringgold, Ga., and George R. Madewell, Hixson, Tenn., assignors to Combustion Engineering, Inc., Windsor, Conn., a corporation of Delaware
Filed Oct. 10, 1968, Ser. No. 766,422
Int. Cl. B23k 9/12
U.S. Cl. 219—126    10 Claims

ABSTRACT OF THE DISCLOSURE

An apparatus for the joining by welding of thick plates having a narrow, substantially vertical straight-walled welding groove therebetween. An adjustable mast mounted on a traveling base supports a ram assembly which carries a reciprocable welding torch arrangement. The welding torch arrangement is automatically reciprocated through the depth of the vertical weld groove and vertically adjusted so as to deposit weld beads therein, one on the other, building up a uniform weld seam for the length of the vertical weld groove. The apparatus also includes a novel slack take-up mechanism whereby slack is prevented from occurring in the consumable electrode wire during reciprocation thereof in cooperation with the welding torch.

BACKGROUND OF THE INVENTION

This invention relates to a welding apparatus and particularly to an arrangement for welding thick plates having a narrow, substantially vertical, straight-walled welding groove therebetween. When welding thick plates, past devices required the plates to be oriented so that the weld groove therebetween was horizontal. Considerable time and effort was required to set up and prepare the plates for welding. After set-up and preparation, massive and costly turning and positioning equipment was necesary to manipulate the weld groove under a stationary weld arc. The weld seam resulting from this expensive and time-consuming process was not always completely satisfactory in that the welding techniques required to join the plates tended to lower the strength or toughness characteristics of the plates, and in certain instances required high temperature austenitizing heat treatment to restore the desired properties.

In order to overcome the above-mentioned difficulties and provde an economical and efficient means for welding thick plates, a process was developed whereby the plates to be welded are oriented so that the weld groove therebetween is vertical.

SUMMARY OF THE INVENTION

Our apparatus includes a base assembly traveling on a set of tracks for the purpose of alignment with respect to the plates to be welded. On the base assembly is mounted a vertical mast rotatable about its longitudinal axis. A vertically adjustable apron assembly rides on the mast and supports a horizontal ram. Reciprocable along the horizontal ram is a side beam car which supports a welding torch and a tilt-and-feed mechansm therefor.

In order to accomplish the welding of thick plates oriented so as to have a vertical weld groove therebetween, the horizontal ram of our apparatus is adjusted to be parallel with the weld groove by moving the base on the tracks and rotating the mast about its longitudinal axis. The side beam car is then reciprocated along the ram causing the welding torch to traverse the weld groove through the depth thereof. The tip of the torch is directed downwardly so that weld beads are deposited in the weld groove through the depth thereof as the torch traverses the groove. The tilt-and-feed mechanism automatically feeds consumable electrode wire to the torch to form the weld beads by standard welding techniques while tilting the torch about its longitudinal axis so as to apply overlapping beads in the weld groove. As the beads are deposited, the horizontal ram is automatically vertically adjusted so that a uniform weld seam will be built-up for the length of the weld groove.

Additionally, a slack take-up mechanism is provided whereby slack is prevented from occurring in the consumable electrode wire during reciprocation thereof in cooperation with the welding torch. A first hub is mounted on the horizontal ram. A second hub is rotatably mounted on the horizontal ram on the same axis as the first hub and is fixed thereto for common rotation. A third hub is rotatably mounted in spaced relation to the horizontal ram and said first hub and is connected to the consumable electrode wire supply reel. A first cable is connected between the first hub and the welding torch assembly and a second cable is connected between the second hub and the third hub. By a proper selection of the sizes of the three hubs and the supply reel, proportional movement of the reciprocating movement of the welding torch may be transmitted through the cable means to the supply reel so that when the welding torch is retracted, the supply reel will rotate an equal linear distance to retract the consumable welding wire and prevent slack from occurring therein.

BRIEF DESCRIPTION OF THE DRAWINGS

FIGURE 2 is a side elevation of the apparatus of FIGURE 1.

FIGURE 3 is a rear elevation of the apparatus of FIGURE 1, again with portions removed for simplicity.

FIGURE 4 is a view partly in section of the tilt-and-feed mechanism of this invention and its relation to the horizontal ram.

FIGURE 5 is a side elevation of the apparatus of FIGURE 4.

FIGURE 6 is a side elevation of the welding torch of the apparatus of this invention.

FIGURE 7 is a bottom view of the welding torch of FIGURE 6.

FIGURE 8 is a sectional view of the welding torch along the lines 8—8 of FIGURE 6.

FIGURE 9 is a sectional view along lines 9—9 of FIGURE 5 of a portion of the slack take-up mechanism.

FIGURE 10 is an end view of the welding torch as located within a welding groove.

DESCRIPTION OF THE PREFERRED EMBODIMENT

Figure 1:
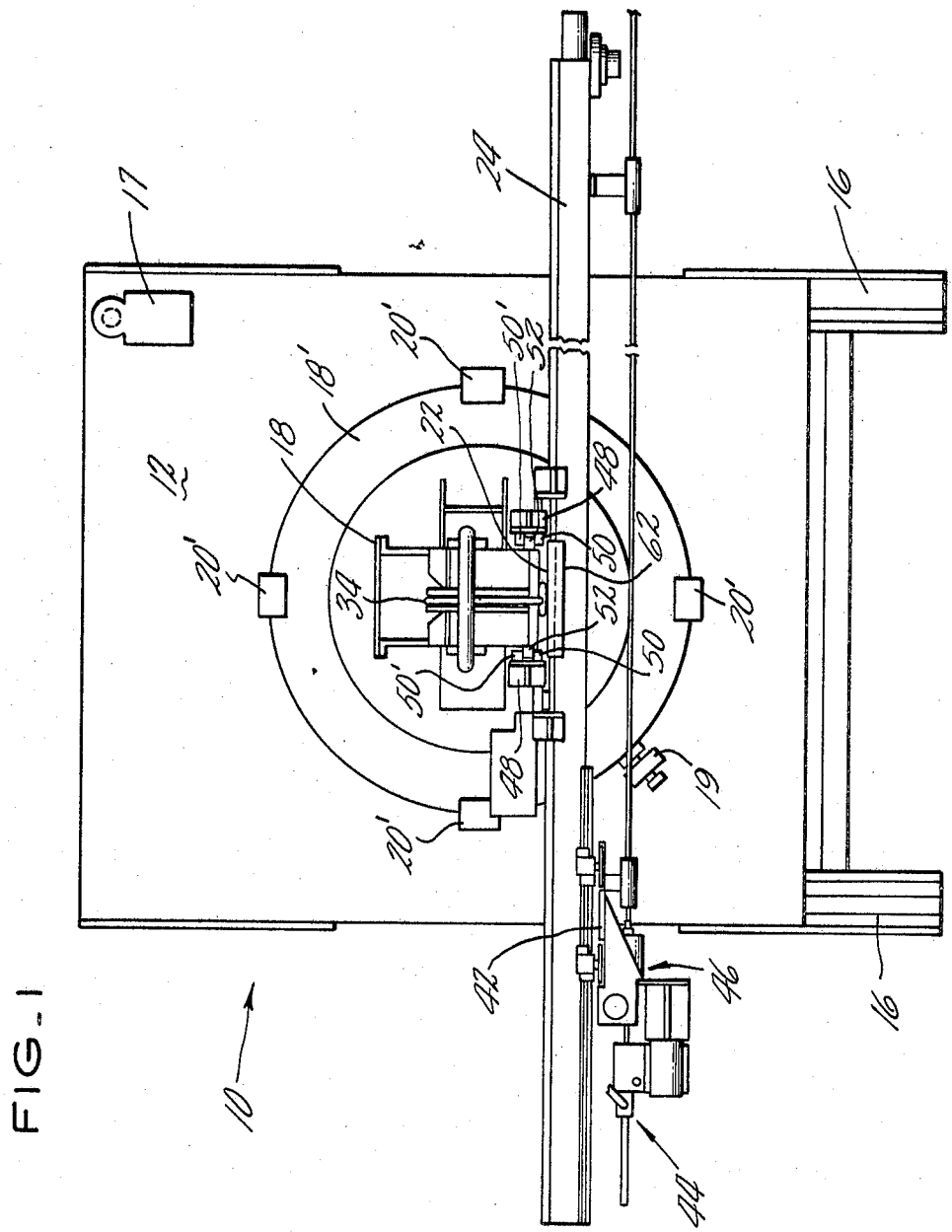
FIGURE 1 is a plan view of the apparatus of this invention with portions removed for simplicity.

Referring now to the drawings, FIGURES 1 to 3 show the overall construction of the general apparatus 10 of our invention. A base 12, having wheels 14, 14' cooperating with the tracks 16, 16' is propelled by a motor 17 of any well-known type. Mounted on the base 12 is a mast 18 having a base portion 18'. The mast 18 is rotatable about its longitudinal axis by a motor 19, the motor 19 serving to rotate the base portion 18' of the mast 18 about the center bearing 20 within the safety lugs 20'.

An apron assembly 22 is mounted for vertical movement on mast 18. Supports 48 attached to the apron assembly 22 carry guide wheels 50, 50' which have the vertical tracks 52 of mast 18 entrained therebetween. The apron assembly 22, which supports a horizontal ram 24 for longitudinal movement with respect thereto, is vertically adjustable on the tracks 52 by means of a jack screw 26 while being constrained against lateral movement by guide rollers 51. The jack screw 26 rotated by a motor 28 driving a belt 30 to a gearing box 32, serves to support the assembly 22, as well as regulate its vertical position. Cable means 34 is additionally provided to support the assembly 22. Cable means 34, entrained over pulleys 38 and 40 as shown in FIGURE 3, is attached at one end to an eye 36 on the apron assembly 22 and at the other end to a counterweight (not shown) within the housing of mast 18. The cable 34 and the counterweight serve as a safety feature in that they will support the apron assembly 22 (and that which it in turn supports) upon mechanical failure of the jack screw 26.

The horizontal ram 24, at the forward portion thereof, supports a side beam car 42 which is reciprocated along the horizontal ram. The side beam car 42 in turn supports a welding torch assembly 44 and a tilt-and-feed mechanism assembly 46 therefor. FIGURE 4 is a detailed view of the adjustable mounting of the horizontal ram 24 on apron assembly 22 and the mounting of side beam car 42 on the horizontal ram 24. Apron assembly 22 carries support means 54 which have guide rollers 56 cooperating with tracks 58 of the horizontal ram 24. Rollers 60 and guide channels 62 (FIGURE 2) further serve to constrain the horizontal ram 24 for reciprocal horizontal movement on the apron assembly 22. The horizontal ram 24 has an additional track arrangement 64 along which the guide rollers 66 of the supports 68 of the side beam car 42 reciprocate.

Reciprocation of the side beam car 42 is accomplished by means of the double acting cable cylinder 70 (see FIGURE 5). The cylinder 70 has a support 72 at each end (only one end shown) attached to the horizontal ram 24. Each support 72 has bifurcated portions 74 supporting a pulley 76 over which an actuating cable 78 is entrained. The cable 78 is attached at its mid-point to a bracket 80 which in turn is attached to the side beam car 42. Reciprocation of the cable 78 by the double acting cable cylinder 70 will thus result in the reciprocation of the side beam car 42 for the purpose to be explained hereinbelow.

Mounted on side beam car 42 is a tilt-and-feed mechanism assembly 46. The tilt-and-feed mechanism assembly 46 comprises a bracket 82 carrying a support 84 for a constant speed motor 86. The motor 86 drives a worm gear 88 mounted on the motor shaft 89 supported by the bearings 90 and 91. Also mounted on the bracket 82 is a hollow shaft 92 upon which a pinion gear 94 is mounted. The pinion gear 94 is formed as a segment of (or otherwise connected to) a bracket 96 having a portion 98 attached to a motor support bracket 99 which supports a wire feed motor 100. Connected to the wire feed motor 100 by means of a coupling 102 is the welding torch assembly 44.

As best shown in FIGURES 6 through 8, the welding torch assembly 44 comprises an elongated housing 104 with a downwardly directed tip portion 106. A metal plate 108 serves as the means by which electrical connection to the welding torch is made, such as at terminal 109. Cylinder 110, connected to the plate 108, serves the dual purpose of guiding a consumable electrode wire 112 through bore 114 thereof (FIGURE 8) and providing for connection to the coupling means 102 of the tilt-and-feed mechanism 46 as at portion 116. Fluid connection housing 118 is fixed to plate 108 by bolt means 120. This housing contains cooling fluid connections 122 which communicate with conduits 124 to provide for the admission of cooling means to the housing 104 of the welding torch for the purpose of maintaining the torch at workable temperatures. Attached to the housing 104 and the upper portion of cylinder 110 are plates 126 which form a connecting chamber for a flux inlet means 128. This flux inlet chamber communicates with a passage 130 within the housing 104 to deposit welding flux ahead of the consumable electrode wire 112 during the welding operation. The housing 104 also provides a passage for the consumable electrode wire 112 to the downwardly directed end portion 106 egressing therefrom at the welding tip directing portion 132. This portion 132 has side protecting pads 134 for the purpose to be explained hereinbelow.

At the rear end of the horizontal ram 24 there is located a consumable electrode wire supply reel assembly 136. Bracket 138 supports a pivot 140 about which a supply reel spool 142 is mounted for rotation. The spool 142 has plural arms 144 (only one shown) connected to wire reel containment means 146. The consumable electrode wire 112 is mounted within the containment means 146 and is directed therefrom to the welding torch assembly 44, being guided at points along its length by guide sleeves 148.

In conjunction with the supply reel assembly 136 there is provided a novel slack take-up means to prevent the occurrences of slack in the electrode wire between the welding torch assembly 44 and the supply reel assembly 136. On the rear end of ram 24 there is mounted a hub arrangement 150. Within the housing 152 of the hub arrangement 150 is located a first hub 154 and a second hub 156 keyed together for common rotation about a pivot 158 (FIGURE 9). A first cable 160 is entrained about the hub 154 and at one end is fixed thereto by the connection 162. This cable passes along the horizontal ram 24 through the protective housing 164 to a connection 166 for the other end thereof on the side beam car 42. A pulley 168 is rotatably mounted on the ram 24 by means of a pivot 170. Pulley 168 is a reversing pulley in that when cable 160 passes over the pulley 168, movement of the side beam car 42 will result in a generally proportional movement of the cable 160 in a direction opposite to the movement of the side beam car 42.

Surrounding the spool 142 of the supply reel 136 is a third hub 172. Hub 172 has a brake band 174 about its circumference, with the tension of this band adjustable by the spring load adjusting means 176. A second cable communicates between the third hub 172 and the second hub 156, being connected to the respective hubs at its ends. The three hubs (154, 156, 172) and the wire supply reel within the containment means 146 are so sized that the ratio of the diameter of the first hub to the diameter of the second hub is equal to the ratio of the diameter of the supply reel to the diameter of the third hub. Thus, rotation of the first hub due to action of the cable 160, as representative of the reciprocal movement of the side beam car 42, results in proportional rotation of the consumable electrode wire supply reel so as to rewind the supply reel, thus preventing slack in the consumable electrode wire 112 from occurring. It is, of course, understood that this novel slack take-up means may be used in conjunction with any other suitable wire reel feed application and is not limited to the particular one shown.

Attached to the horizontal ram 24 are control panels 184 and 186. The panel 184 contains the necessary control switches for setting the proper sequence of operation of the welding process as to be explained hereinbelow. The panel 186 contains stop clock type timers which regulate the "on" times of the motor 86, the double acting cable cylinder 70 and the motor 28, respectively. The position of these panels on the ram 24 facilitates control of the apparatus by the operator by allowing him to be stationed immediately adjacent the work area. Also in cooperation with the ram 24 is a flux tank 194 supported by adjustable braces 196 for the purpose of supplying flux to the welding torch assembly 44 through conduit 198. Located beneath the ram 24 is a hanger 200 provided for the location of a pneumatic hammer 202 which may be used by the operator to remove submerged arc slag formed during the welding procedure.

The operation of our invention is as follows. The work pieces to be welded are oriented so that a substantially vertical weld groove having a length greater than its depth and generally parallel, straight side walls is formed. Base 12 is then moved along tracks 16, 16' by motor 17 so that the horizontal ram 24 will be generally aligned with the vertical welding groove. The mast 18 is then rotated about its longitudinal axis by means of the motor 19 for final alignment. The motor 28 is actuated to raise or lower the apron assembly 22 on tracks 52 to the particular height at which the welding seam is to be initiated whereupon the horizontal ram 24 is moved longitudinally with respect to the supporting apron assembly 22 until the forward end thereof is adjacent the vertical welding groove between the work pieces. After proper alignment, the operator will set the appropriate control switches on the panel 184 to obtain operation of the welding torch so as to form a particular desired weld seam. Such controlled operations include, for example, ram forward and retraction speeds, rate of change of ram speed to compensate for variation in weld groove thickness, flux supply to the welding torch, and necessary welding voltage to form proper weld beads. The operator will also set the timers in the control panel 186. By this regulation he will control and coordinate the reciprocation of the side beam car 42, the operation of the motor 86 (for the purpose of tilting the welding torch about its longitudinal axis) and the operation of motor 28 to vertically advance the horizontal ram 24; such coordination is necessary to properly build up the desired weld seam.

When the control arrangements and power to the welding torch is set, operation of the apparatus may be initiated. The double acting cable cylinder 70 will reciprocate the side beam car 42 causing the welding torch assembly 44 to traverse the welding groove through the depth thereof. As the beads of the consumable electrode wire 112 are deposited, additional wire will be fed to the torch assembly 44 by the wire feed motor 100. Between successive passes of the welding torch assembly 44 through the welding groove, the motor 86 will operate for a set specific time (as preset by one of the timers of panel 186). The operation of motor 86 drives the worm gear 88 which in turn drives the pinion gear 94 to tilt bracket 96. This results in a tilting of the consumable wire feed motor 100, and the welding torch assembly 44 coupled thereto, of about 1° to 3°. This tilting about axis A (approximately ⅔ of the height of the welding torch as shown in FIGURE 10) allows for the depositing of overlapping welding beads W. By the particular positioning of the axis A, the side protecting pads 134 contact the side walls of the work pieces P upon the tilting of the welding torch assembly 44 about the axis so as to prevent the lower portion of housing 104 from contacting the side walls (and generating an undesirable arc therebetween) while at the same time keeping the upper portion of the housing 104 spaced from the side walls. The contact of the pads 134 with the side walls also serves as a gauge for the electrode wire to the side wall providing a more constant arc to the bottom of the weld groove resulting in more uniform weld bead formation.

As the welding torch assembly 44 is reciprocated through the welding groove, flux is fed thereto through conduit 198 from the flux tank 194 for the purpose of properly shielding the welding arc. Also cooling fluid is admitted through the fluid connections 122 and conduits 124 to maintain a workable temperature in the welding torch housing 104. After each welding pass, or as otherwise necessary, the operation may be suspended for sufficient time to allow the operator to clear the slag from the welding groove by means of the scaling tool 202.

Consumable electrode wire 112 is fed through by the feed motor 100 at a rate sufficient to ensure uniform weld bead deposits upon forward progression of the welding torch assembly 44, this rate being determined by a specific setting on the control panel 184. During the return stroke of the welding torch assembly 44, the consumable electrode wire 112 between the guides 148 would tend to whip if not for the provision of our novel slack take-up means. As the side beam car 42 moves in a forward direction, the consumable electrode wire will also be moved in a forward direction at a rate just slightly greater than the rate of the side beam car (to compensate for the wire being consumed by weld bead deposit). As the consumable electrode wire 112 is fed in the forward direction, the supply reel 136 will rotate counterclockwise about the pivot 140. During this rotation, the second cable 178 is wrapped around the brake band 174 (and the third hub 172) while unraveling from the second hub 156 and thus rotating pivot 158. The rotation of pivot 158, allowing the unraveling of the second cable 178 from the second hub 156, accomplishes the wrapping of the first cable 160 around the first hub 154, the first cable 160 proportionally moving in a relative direction opposite to the direction of the side beam car 42 as a result of the reversing pulley 168 as heretofore explained. Due to the size of the first, second, and a third hub and the supply reel, as noted above, the actions of the cables 160 and 178 will result in a proportional angular rotation of the supply reel with respect to the angular rotation of the hub arrangement 150 and a linear movement of the electrode wire 112 corresponding to the movement of the side beam car 42. Therefore, upon retraction of the welding torch assembly 44 and corresponding rearward movement of side beam car 42, the cables 160 and 178 will operate in a reverse manner to rotate the supply reel in a clockwise direction to rewind the consumable electrode wire 112 thereon, which would otherwise become slack and tend to whip. The purpose of the adjusting means 176 for the brake band 174 is to regulate the friction force between the third hub 172 and the supply reel spool 142. The tension in the brake band 174 is set by the spring load adjusting means 176 so as to allow relative rotation between the spool 142 and third hub 172 upon application of sufficient force (e.g. from feed motor 100) to accomplish relative supply reel rotation of such a degree so as to compensate for the consumable electrode wire 112 being deposited as the weld bead.

Thus it can be seen that we have invented a novel apparatus for building up a uniform vertical weld seam between thick plates offering simplicity and economy heretofore unknown in the joining of thick plates by welding. The apparatus is completely adjustable so as to eliminate the necessity of massive turning and positioning equipment for the work pieces to be joined. Once the apparatus is aligned with the groove in which the vertical weld seam is to be formed, controls may be set so as to completely regulate the progessive deposition of the weld bead transversely through the depth of the welding groove, compensating for the vertical build-up by uniformly, vertically advancing the axis of reciprocation of the welding torch. Automatic control is also accomplished over the orientation of the welding torch about its longitudinal axis; such control results in the tilting of the welding torch about this axis after successive passes through the weld groove to yield overlapping weld beads for improved weld seam strength.

Additionally, we have provided a novel slack take-up means which prevents the reciprocating consumable electrode wire from whipping under circumstances when slack would otherwise occur. By particularly providing for a degree of rotation of the consumable electrode wire supply reel proportional to the linear reciprocation of the welding torch, the supply reel will rotate to rewind an amount of the wire equal to the distance of retraction of the welding torch, thus preventing any slack from occurring in the wire.

While we have illustrated and described a preferred embodiment of our invention, it is to be understood that such is merely illustrative and not restrictive and that variations may be made therein without departing from the spirit and scope of the invention. We therefore do not wish to be limited to the precise details but desire to avail ourselves of such changes as fall within the purview of our invention.

We claim:

1. An apparatus for the joining by welding of plates having a narrow, substantially vertical, straight-walled weld groove therebetween, the apparatus comprising:
- a traveling base assembly;
- a vertical mast mounted on said base assembly;
- a vertically adjustable ram supporting means mounted on said vertical mast;
- a horizontal ram supported by said ram supporting means;
- a welding means reciprocably mounted on said horizontal ram;
- a supply reel assembly of consumable electrode wire to supply said welding means with weld material for forming a weld seam;
- a tilt-and-feed mechanism controlling orientation of said consumable electrode wire about its longitudinal axis and the feeding thereof; and
- automatic control means for controlling and coordinating the consumable electrode wire feed and orientation about its longitudinal axis, the reciprocation of said welding means, and the vertical adjustment of said ram supporting means whereby said welding means will deposit a plurality of weld beads of said consumable electrode wire through the depth of the weld groove, one on the other, to build up a weld seam for the length of the vertical weld groove.

2. The apparatus of claim 1 wherein the supply reel assembly of consumable electrode wire includes a rotatable supply reel and a slack take-up means whereby slack is prevented in said consumable electrode wire between said supply reel and said welding means upon reciprocation of said welding means.

3. An apparatus for the joining by welding of plates having a narrow, substantially vertical, straight-walled weld groove therebetween, the apparatus comprising:
- a traveling base assembly;
- a vertical mast mounted on said base assembly;
- a vertically adjustable ram supporting means mounted on said vertical mast;
- a horizontal ram supported by said ram supporting means;
- a welding means reciprocably mounted on said horizontal ram;
- a supply reel assembly of consumable electrode wire to supply said welding means with weld material for forming a weld seam, said supply reel assembly including a rotatable supply reel and a slack take-up means, said slack take-up means including a first hub rotatably mounted on said horizontal ram, a second hub rotatably mounted on said horizontal ram on the same axis as said first hub and connected to said second hub for rotation therewith, a third hub rotatably mounted in spaced relation to said horizontal ram and said first hub, said supply reel adjustably mounted on said third hub for limited rotation therewith, a first cable means connected between said first hub and said welding means, a second cable means connected between said second hub and said third hub, said supply reel and said first, second and third hubs are of such a size so that the ratio of the diameter of said supply reel to the diameter of said third hub is equal to the ratio of the diameter of said first hub to the diameter of said second hub whereby reciprocation of said welding means acts on said first cable to produce rotation of said first hub and said second hub attached thereto, which in turn causes, through said second cable, a proportional rotation of said third hub and said supply reel; and
- automatic control means for controlling and coordinating the supply of said consumable electrode wire, the reciprocation of said welding means, and the vertical adjustment of said ram supporting means whereby said welding means will deposit a plurality of weld beads of said consumable electrode wire through the depth of the weld groove, one on the other, to build up a weld seam for the length of the vertical weld groove.

4. The apparatus of claim 3 wherein said vertical mast is adjustably mounted on said base for rotation about its longitudinal axis.

5. The apparatus of claim 1 wherein said welding means comprises:
- a side beam car slideably mounted on said horizontal ram so as to permit relative movement therebetween;
- an actuating means for reciprocably moving said side beam car with respect to said horizontal ram;
- a welding torch arrangement; and wherein
- said tilt-and-feed mechanism is mounted on said side beam car for supporting said welding torch arrangement.

6. The apparatus of claim 5 wherein said welding torch arrangement comprises:
- an elongated housing having a downwardly turned end portion, said housing having plural passages extending therethrough, said consumable electrode wire being fed through one of said passages and arc shielding flux being fed through another;
- means for cooling said elongated housing; and
- protective means located on said downwardly turned end portion of said housing to prevent said end portion from contacting the sides of the weld groove when passed therethrough.

7. The apparatus of claim 5 wherein said tilt-and-feed mechanism comprises:
- a reversible motor mounted on said side beam car, said motor reversibly actuating a driving gear;
- a driven gear rotatably mounted on said side beam car on an axis parallel to the longitudinal axis thereof and in operable association with said driving gear so as to be driven thereby;
- support means fixed to said driven gear for rotation therewith; and
- a consumable electrode wire feeding motor supported by said support means, said wire feeding motor having a connecting means whereby said welding torch arrangement is connected thereto, said feeding motor serving to feed the consumable electrode wire through said connecting means to said welding torch arrangement.

8. The apparatus of claim 7 wherein said automatic control means comprise a series of timer means, said timer means regulating and coordinating the operation of said vertically adjustable ram supporting means, said actuating means for reciprocably moving said side beam car, and said reversible motor mounted on said side beam car so as to accomplish the uniform build-up of said weld seam in said vertical weld groove by progressive elevation of said welding torch arrangement, reciprocation of said arrangement back and forth through said groove, and the oscillation thereof about its longitudinal axis.

9. The apparatus of claim 1 wherein the automatic control means comprise:
- means to control the vertical position of said ram supporting means;
- means to horizontally reciprocate said welding means;
- means to orient said welding means about its longitudinal axis; and
- a series of timer means regulating and coordinating the operating times of said ram positioning means, said welding means reciprocating means and said welding means orienting means so as to accomplish the uniform build-up of said weld seam in said vertical weld groove.

10. An apparatus for the joining by welding of plates having a narrow, substantially vertical, straight-walled weld groove therebetween, the apparatus comprising a base assembly mounted for movement relative to said plates to be joined; a mast rotatably mounted on said base assembly for rotation about its longitudinal axis; a horizontal ram adjustably supported on said mast for vertical movement with respect thereto; a side beam car slideably mounted on said horizontal ram; a double acting cylinder mounted on said horizontal ram and connected to said side beam car for reciprocably moving said side beam car with respect to said horizontal ram; a welding torch having an elongated housing with a downwardly directed consumable electrode wire guide portion; a tilt-and-feed mechanism supporting said welding torch mounted on said side beam car, said tilt-and-feed mechanism having a reversible motor means for tilting said welding torch about the longitudinal axis thereof and a wire feeding motor means for feeding consumable electrode wire to said welding torch; a rotatable supply reel for supplying consumable electrode wire to said wire feeding motor, said supply reel having a slack take-up means for preventing slack in said wire between said supply reel and said wire feeding motor; and automatic control means for controlling and coordinating the wire feeding by said wire feeding motor, the reciprocation of said side beam car by said double acting cylinder, and the vertical adjustment of said horizontal ram whereby said welding torch will deposit a plurality of weld beads of consumable electrode wire through the depth of the weld groove, one on the other, to build up a weld seam for the length of the vertical weld groove.

References Cited

UNITED STATES PATENTS

| | | | |
|---|---|---|---|
| 1,947,300 | 2/1934 | Mayoh | 219—126 |
| 2,944,141 | 7/1960 | Lovrenich | 219—124 |
| 3,072,779 | 1/1963 | Masters et al. | 219—125 |
| 3,119,009 | 1/1964 | Zeller | 219—125 |
| 3,144,544 | 8/1964 | Kurtz | 242—54 |
| 3,171,012 | 2/1965 | Morehead | 219—124 |
| 3,255,944 | 6/1966 | Yadron et al. | 219—126 |
| 3,296,412 | 1/1967 | Waite et al. | 219—126 |
| 3,314,623 | 4/1967 | Blandino | 226—143 |
| 3,328,556 | 6/1967 | Nelson et al. | 219—124 |
| 3,388,890 | 6/1968 | Born et al. | 226—195 |

JOSEPH V. TRUHE, Primary Examiner

W. DEXTER BROOKS, Assistant Examiner